United States Patent [19]

Kumagai et al.

[11] Patent Number: 4,810,597
[45] Date of Patent: Mar. 7, 1989

[54] FUEL CELL COMPRISING A DEVICE FOR DETECTING THE CONCENTRATION OF METHANOL

[75] Inventors: Teruo Kumagai; Tatsuo Horiba, both of Hitachi; Tomoichi Kamo, Ibaraki; Seiji Takeuchi, Hitachiohta; Kazuo Iwamoto, Hitachi; Kunko Kitami, Hitachi; Kohki Tamura, Hitachi, all of Japan

[73] Assignee: Hitachi, Ltd., Tokyo, Japan

[21] Appl. No.: 709,204

[22] Filed: Mar. 7, 1985

[30] Foreign Application Priority Data

Mar. 7, 1984 [JP] Japan ................ 59-42081

[51] Int. Cl.$^4$ ............................................. H01M 8/04
[52] U.S. Cl. ......................................... 429/22; 429/23
[58] Field of Search ........................... 429/23, 22, 12

[56] References Cited

U.S. PATENT DOCUMENTS

| | | | |
|---|---|---|---|
| 3,542,597 | 11/1970 | Smith et al. | 429/23 X |
| 3,592,694 | 7/1971 | Urbach et al. | 429/23 |
| 3,716,416 | 2/1973 | Adlhart et al. | 429/23 |
| 3,753,780 | 8/1973 | Fetterman | 429/23 |
| 3,847,673 | 11/1974 | Kordesch et al. | 429/23 |
| 3,849,201 | 11/1974 | Kordesch | 429/23 X |
| 4,478,917 | 10/1984 | Fujita et al. | 429/33 |
| 4,537,840 | 8/1985 | Tsukui et al. | 429/34 X |
| 4,562,123 | 12/1985 | Shimizu et al. | 429/27 |

OTHER PUBLICATIONS

Nakamura, Japanese Laid-Open Patent Application No. 56-118273 (1981).

*Primary Examiner*—Anthony Skapars
*Attorney, Agent, or Firm*—Antonelli, Terry & Wands

[57] ABSTRACT

In a fuel cell having a fuel electrode, an oxidant electrode, and an electrolyte which is located between both the electrodes, a methanol concentration control device is disposed, at a pipe which supplies the fuel to the fuel cell for controlling the amount of the methanol in the pipe by detecting the open-circuit voltage of the unit cell or the open-circuit potential of the oxidant cell at the methanol concentration control device.

13 Claims, 8 Drawing Sheets

FUEL CELL COMPRISING A DEVICE FOR DETECTING THE CONCENTRATION OF METHANOL

The present invention relates to a fuel cell, and more particularly to a methanol-air, acid electrolyte fuel cell.

A fuel cell which is supplied with fuel and an oxidant and in which electrochemical reactions are performed on electrodes to directly derive electric energy, has been recognized as a new type of power source from which a high efficiency can be expected. Especially as a small-sized power source for portable use, a methanol-air, acid electrolyte fuel cell has come into the limelight among fuel cells which employ liquids as fuels. Methanol can be readily produced by the fermentation of microorganisms, the liquefaction of coal, etc., and is easy to handle. It is, accordingly, expected to put the methanol fuel cell into practical use.

The methanol concentration in the fuel to be fed to the fuel cell is important for keeping a predetermined power output from the fuel cell. When the methanol concentration is below a predetermined value, naturally the output is lower. When the methanol concentration is raised, the output power is attained. However, more methanol passes through the electrolyte due to electro-osmosis, diffusion, etc., and more methanol is consumed by the oxidant electrode, so that the utilization factor of the methanol degrades.

For this reason, in order to hold the output power without fluctuating, the fuel needs to be fed with its methanol concentration held constant within the predetermined concentration range.

As seen from FIG. 2 of Japanese Laid-Open Patent Application No. 56-118273 (1981) for "Concentration Sensor of Fuel Cell", there is a proposal for detecting the concentration of methanol in fuel, in which a small-sized fuel cell is separately formed, fuel is introduced into the fuel cell so as to generate power, and the methanol concentration of the fuel is detected and controlled on the basis of the electromotive force of the small-sized cell at that time.

In accordance with this proposal, an oxidant electrode is supplied with air and an electrolyte liquid, and since bubbling is required, there is a need for an air chamber.

SUMMARY OF THE INVENTION

An object of the present invention is to provide a fuel cell which has a device for detecting the concentration of methanol in fuel to be fed to the fuel cell and for maintaining the methanol concentration constant without utilizing a complicated air chamber, whereby output power can be maintained without fluctuating.

Extensive studies were made on the development of the fuel cell. As a result, it has been revealed that, in accordance with this invention, at the operating temperatures 50°-60° C. of a fuel cell, the open-circuit voltage of the cell shown in FIG. 2, hereinafter described, has a methanol concentration-dependence as shown in FIG. 4. Besides, the dependence of the open-circuit voltage on the methanol concentration of the fuel cell electrode shown in FIG. 9 at the time at which the oxidant electrode is immersed in the fuel containing an electrolyte (anolyte) is shown in FIG. 5. These relationships indicate that the open-circuit voltage and potential corresponding to a methanol concentration can serve as scales indicative of the methanol concentration as shown in FIGS. 4 and 5.

The present invention exploits the presence of the concentration dependence described above, and provides a device in which the concentration of methanol in fuel to be supplied is controlled to be constant at a predetermined concentration by utilizing the open-circuit voltage of the unit cell, the open-circuit potential of the oxidant electrode. The present invention is based on the discovery that a methanol concentration can be determined on the basis of the amount by which the methanol permeates and mixes into an air electrode as shown in FIGS. 2 and 9, in which a complicated air chamber shown in the prior art is not equipped.

The present invention comprises the following three systems:

(1) A unit cell, as shown in FIGS. 2 and 7, is disposed at the fuel feed port of a fuel cell, the open-circuit voltage of a unit cell is detected, and fresh methanol is supplied to maintain a predetermined open-circuit potential, whereby fuel at a substantially constant concentration within a predetermined concentration range is supplied to the fuel cell.

(2) A unit cell, as shown in FIGS. 6 and 8, is disposed at the fuel feed port of a fuel cell, a unit cell which holds methanol of predetermined concentration (for example, 1 mol/l) is further utilized, the open-circuit voltages of the respective unit cells are detected, and the feed of methanol is controlled so that the open-circuit voltages may become an identical value, whereby the methanol concentration of fuel to be supplied to the fuel cell is kept constant at the predetermined concentration.

(3) As shown in FIGS. 9 and 11, anolyte is held in contact with an oxidant electrode, the concentration of methanol is detected in terms of potential lowering on that occasion, and methanol is supplied to a fuel cell anew in accordance with the detected signal, whereby the methanol concentration is held constant.

Regarding system (3) as shown in FIG. 9, it is possible to establish, for example, a system wherein a counter electrode opposite to the oxidant electrode is immersed in the same anolyte as that of the oxidant electrode, or as shown in FIG. 11, a system wherein a diaphragm such as an ion-exchange membrane is interposed between the oxidant electrode and the counter electrode, the anolyte is circulated between the diaphragm and the oxidant electrode, and the interspace between the diaphragm and the counter electrode is supplied with a standard solution such as reference anolyte containing a fixed amount of methanol or the aqueous solution of sulfuric acid being an electrolyte. Further, a 2-cell system is possible wherein a reference methanol concentration cell (whose methanol concentration may well be zero) is disposed as in the aforementioned system (2), and the difference between the voltages of the reference cell and a cell to be measured is evaluated, thereby to detect the methanol concentration of the anolyte of the fuel cell. As the material forming the counter electrode in the system (3), any material is usable as long as it is chemically stable against the electrolyte and is electrically conductive.

DETAILED DESCRIPTION OF THE PREFERRED EMBODIMENTS

The fuel cell of the present invention is a methanol fuel cell in which a device for controlling the concentration of methanol in fuel is disposed at a port for supplying the fuel.

Figure 1:
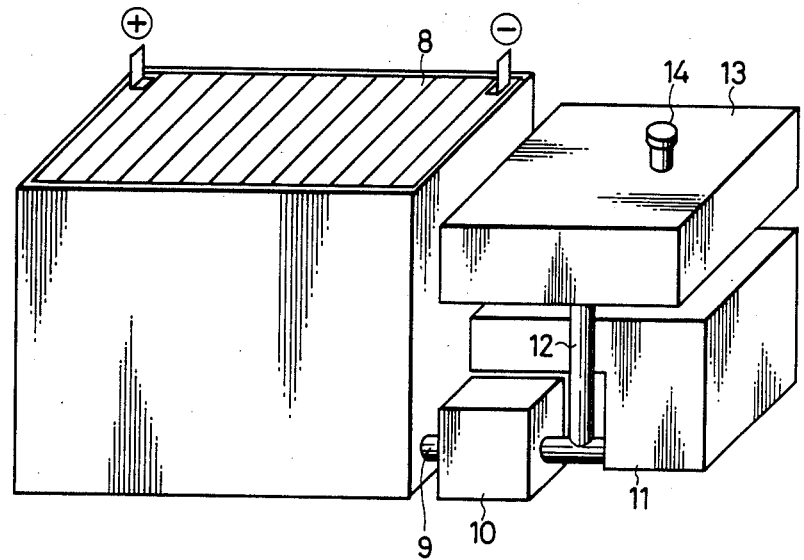
FIG. 1 is a schematic perspective view of a methanol fuel cell furnished with a methanol concentration control device applied to the present invention.

Referring to FIG. 1, a cell stack 8, laminated of 33 cells, is constructed by using fuel electrodes and oxidant electrodes.

An ion-exchange membrane (CMV produced by Asahi Garasu) containing 3 mol/l of sulfuric acid was interposed as an electrolyte between the electrodes in the cells. A pipe 9 for feeding fuel to the cell stack 8 was furnished with a methanol concentration control device 10. Fuel 16 (containing 1.5 mol/l of sulfuric acid) caused to circulate through the cell stack was stored in a fuel tank 11. A 2:1 methanol-water mixture was stored in a fuel tank 13, and new methanol, manually supplied through a supply hole 14 was introduced via a methanol-water feed pipe 12 in accordance with a signal from the methanol concentration control device 10.

Figure 2:
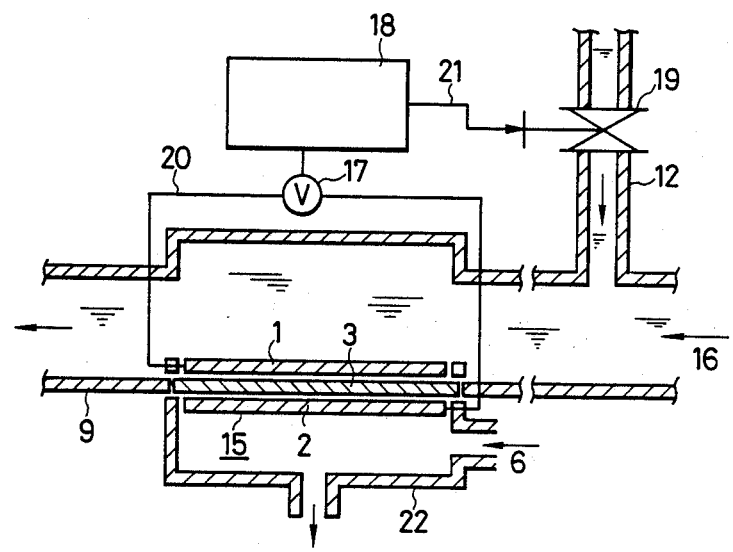
FIG. 2 is a schematic view of the arrangement of one embodiment (I) of a methanol concentration control device.

Referring to FIG. 2, a unit cell 15 comprising a fuel electrode 1 and an oxidant electrode 2, each cut to a size of 10×10 mm, and an ion-exchange membrane 3 containing sulfuric acid interposed closely between the electrodes as the electrolyte, provides a fuel concentration detection portion 22 of the methanol concentration control device 10.

Figure 4:
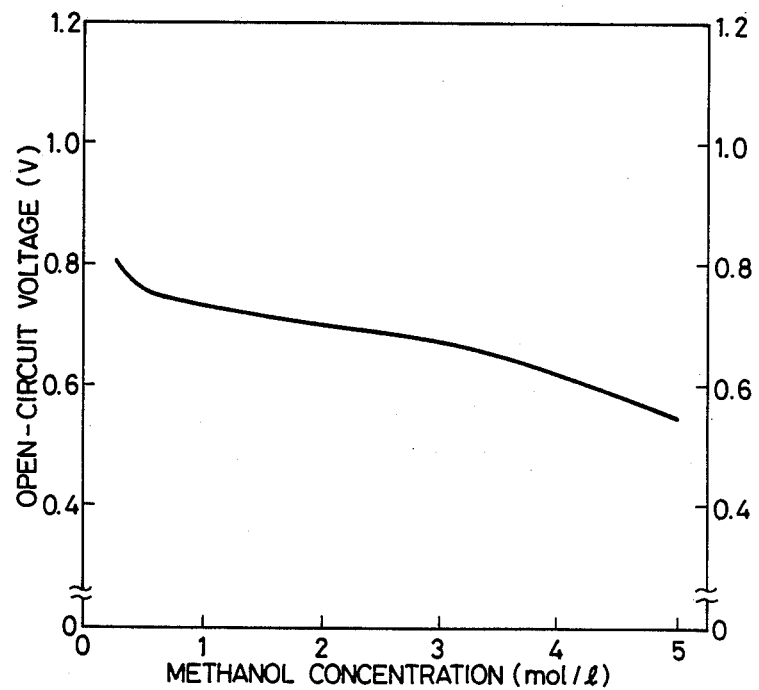
FIG. 4 is a characteristic diagram showing the relationship of the unit cell, shown in FIG. 2, between the methanol concentration of the fuel and the open-circuit voltage.

The fuel electrode 1 on the fuel side is positioned to face the fuel passing through the fuel feed pipe 9. The oxidant (or air) electrode 2 is supplied with a portion of the air 6 which is fed to the cell stack. The open-circuit voltage of the unit cell is sensed by a voltmeter 17 via a lead 20. The sensed signal is feedback-controlled by a compensation device 18 on the basis of the relationship between the open-circuit voltage and the methanol concentration illustrated in FIG. 4, to open or close a methanol-water feed valve 19 to provide a control of the concentration of the methanol in conduit 9 by the addition of the 2:1 methanol-water mixture. The open-circuit voltage of the cell shown in FIG. 2 has a methanol concentration-dependence as shown in FIG. 4. When the open-circuit voltage of the unit cell is sensed by the voltmeter 17, the compensation device 18 controls the concentration of methanol to be a predetermined value by the water feed valve 19 on the basis of the relationship between the open-circuit voltage and the methanol concentration illustrated in FIG. 4. In the compensation device 18 shown in FIG. 2, the relation between methanol concentration and open-circuit voltage shown in FIG. 4 is stored and upon receipt of the open-circuit voltage from voltmeter 17 a control signal is produced. The valve 19 is controlled to open or close by the control signal of the compensation device 18 until the methanol concentration at the electrodes 1 and 2 reaches to the predetermined value which is decided by the electromotive force of the fuel cell. Owing to the provision of the methanol concentration control device 10, the methanol concentration of the fuel to be supplied to the cell stack 8 was controlled in a range of 0.7 mol/-1-1.2 mol/l.

In the 100 watts fuel cell relating to the present invention, the 2:1 methanol-water mixture is supplied to the fuel cell in the proportion of 100 ml/h, when the fuel containing 1.5 mol/l of sulfuric acid circulates through the cell stack in the proportion of 1 liter per minute.

The devices shown in FIG. 2 shall be denoted by E in the following examples.

In this unit cell, as electrodes, a porous carbon carrier such as graphite or furnace black is employed and a catalyst with platinum, ruthenium or the like loaded therein is employed. The loading method may be any of conventional catalyst preparation methods, such as the sedimentation method, impregnation method, intercurrent method and kneading method. The electrodes are fabricated by a method wherein the electrically-conductive porous base is coated with a catalyst paste which has been prepared by adding distilled water and a binder, for example, polytetrafluoroethylene, to the metallic catalyst powder and then by kneading the mixture, and wherein the catalyst paste is dried and baked.

Figure 3:
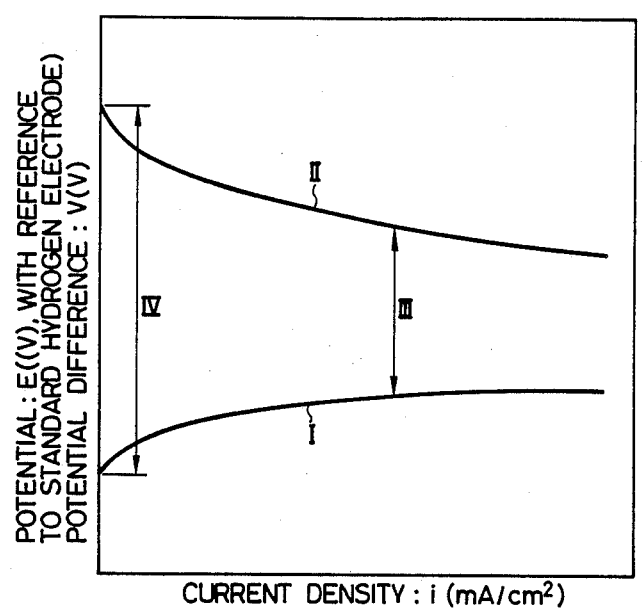
FIG. 3 is a characteristic diagram showing the performance assessment method of electrodes and the cell voltage (potential difference) in terms of a current density—potential (i-E) characteristic model.

The performance of the fabricated electrode is assessed in terms of the current density—potential (I-E) characteristic. As illustrated in FIG. 3, when current is caused to flow, the potential of the fuel electrode designated by curve I, extends in the noble direction (in the figure, upwards) and that of the oxidant electrode, designated by curve II, extends in the base direction (in the figure, downwards) due to the lag of reactions, internal resistance, etc. The difference between the potentials of the electrodes I and II is a cell voltage designated by the distance III. A cell whose cell voltage is great and does not lower even when the current is stopped, is a cell of excellent output power. In FIG. 3, IV shows an open-circuit voltage in which a current density equal to 0 mA/cm$^2$, or no load is connected between the electrodes.

Figure 6:
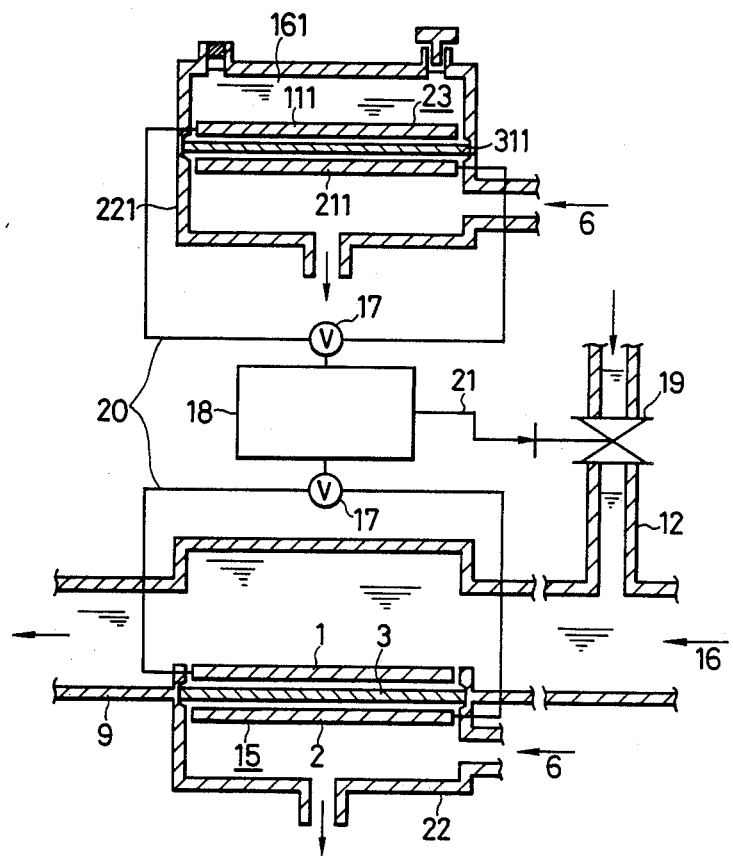
FIG. 6 is a schematic view of another embodiment (II) of a methanol concentration control device.

Referring to another methanol concentration control device shown in FIG. 6, one unit cell 23 having a standard electrolyte solution 161, a fuel electrode 111, an ion-exchange membrane 31 and an oxidant electrode 211, within a second fuel concentration detection portion 221 is arranged together with another unit cell 15 within the first concentration detection portion 22 shown in FIG. 2. The unit cell in portion 221 is filled up with fuel at a desired methanol concentration (1 mol/l) to be fed to the cell stack 8. The open-circuit voltages of the unit cells 15 and 23 were, respectively, sensed by voltmeters 17 via leads 20, and the methanol-water feed valve 19 is opened or closed by the compensation device 18 so that the open-circuit voltages of the unit cells 15 and 23 might be equalized. Owing to the provision of the methanol concentration control device shown in FIG. 6, the methanol concentration of the fuel to be supplied to the cell stack 8 could be controlled within 1 mol/l±0.1 mol/l. The devices of FIG. 6 shall be denoted by F in the following examples.

Figure 7:
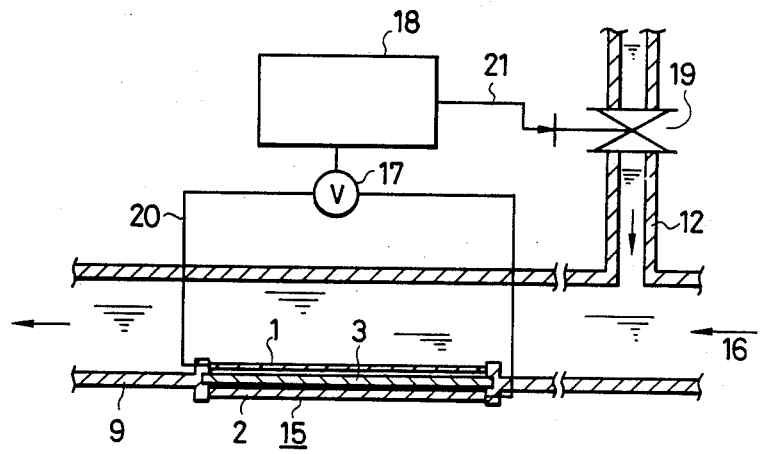
FIG. 7 is a schematic view of yet another embodiment (III) of a methanol concentration control device.

Referring to yet another methanol concentration control device shown in FIG. 7, this methanol concentration control device is controlled similarly to the control device shown in FIG. 2 except that the oxidant electrode 2 is allowed to stand in atmospheric air.

As the fuel 16 circulates through the cell tank together with the 2:1 methanol-water mixture which flows from the tank 13, the methanol concentration of the fuel is reduced from 4 wt.% (1 mol/l) to 3–2 wt.%. This reduced methanol concentration is exhausted for generating an electric power from the fuel cell. For supplementing this reduced methanol concentration exhausted in the cell stack, the new 2:1 methanol-water mixture is supplied through the methanol-water feed valve 19, which is controlled by the compensation device 18. In this embodiment the methanol concentration of anolyte to be supplied to the cell stack 8 could be controlled in a range of 0.8 mol/l–1.2 mol/l.

Figure 8:
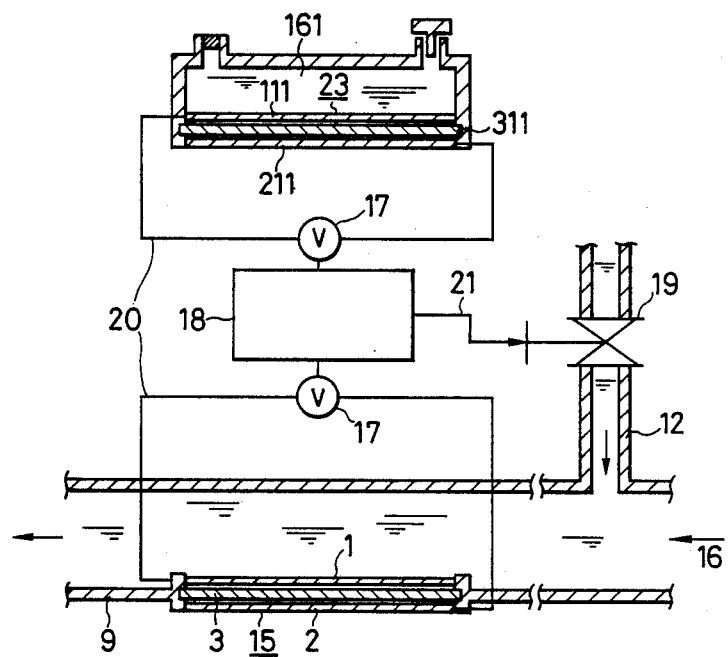
FIG. 8 is a schematic view of still another embodiment (IV) of a methanol concentration control device.

Referring to a methanol concentration control device shown in FIG. 8, this methanol concentration control device is controlled similarly to the control device shown in FIG. 7 except that a second fuel concentration detection portion 221 with unit cell 23 is arranged together with a first fuel concentration detection portion with unit cell as shown in FIG. 7. The oxidant electrode 211 of the second fuel concentration detection portion 221 shown in FIG. 8 is controlled similarly to that of the detection portion 221 shown in FIG. 6 except that the oxidant electrode 211 is allowed to stand in; i.e., is exposed to, the atmospheric air.

Then, the methanol concentration of anolyte to be supplied to the cell stack 8 could be controlled in a range of 0.9 mol/l –1.1 mol/l.

Figure 9:
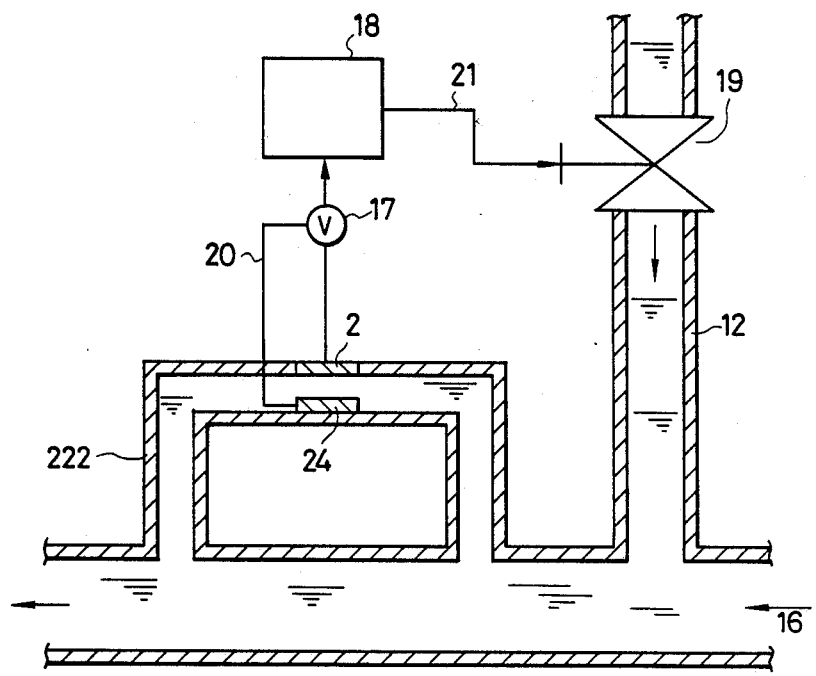
FIG. 9 is a schematic view of a further embodiment (V) of a methanol concentration control device.

The feature of the embodiment of the methanol concentration control device shown in FIG. 9 is that the methanol concentration detection portion 222 differs from those of the methanol concentration detection portions shown in FIGS. 2 and 6 in the following manner:

First, the concentration detecting portion is disposed at the branch pipe of an anolyte flow passage, and the miniaturization of the detection device is thus permitted. Secondly, the detecting portion 222 is composed of the oxidant electrode 2 and a counter electrode 24. The oxidant electrode 2 is a small piece having the same specifications as those of the oxidant electrode of the fuel cell proper, while the counter electrode is a graphite plate.

Figure 5:
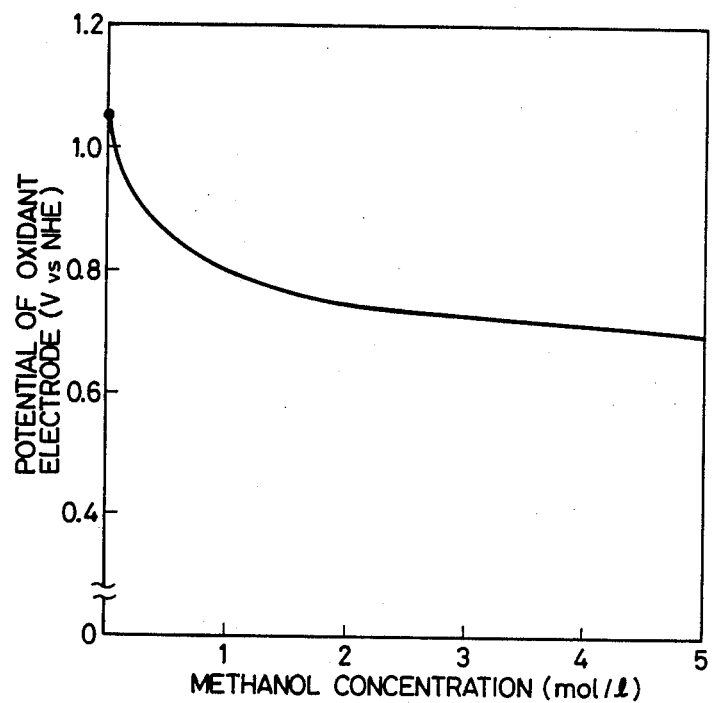
FIG. 5 is a characteristic diagram showing the methanol concentration-dependence of the open-circuit potential of an oxidant electrode shown in FIG. 9.
Figure 10:
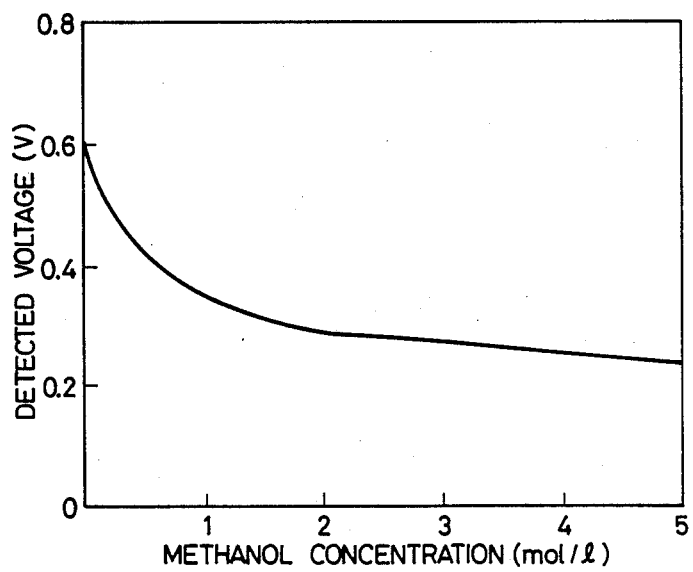
FIG. 10, is a characteristic diagram showing the concentration detection characteristic of the methanol concentration control device shown in FIG. 11.

As the counter electrode 24, there are considered, for example noble metals such as platinum, gold, iridium, rhodium, ruthenium and osmium; base metals, such as lead, niobium, tantalum, zirconium and hafnium, and a carbon material such as graphite. The form of this electrode is, for example, a dense plate such as a metal parallel-plate electrode, a substrate whose surface is coated with platinum black or the like, or a porous electrode similar to the fuel electrode or oxidant electrode of the fuel cell. Regarding the structure wherein the counter electrode has a diaphragm between it and the oxidant electrode, a structure is also possible in which the counter electrode constructed as an oxidant electrode, is supplied with air and confronts the oxidant electrode being an acting electrode. Since the unit cell and the oxidant electrode—counter electrode in the present device need not generate power, no external power source is required. By disposing these means, the methanol concentration of the fuel which is supplied to the fuel cell can be controlled so as to be constant within the predetermined concentration range, and the output voltage of the fuel cell can be maintained constant. Graphite exhibits a substantially constant potential for a constant sulfuric acid concentration irrespective of the methanol concentration, so that the voltage across both the electrodes varies following up the concentration of methanol in anolyte. An example of the result is shown in FIG. 10. The relationship between the methanol concentration and the detection signal is uniquely determined in accordance with FIG. 10. Therefore, when a detected voltage corresponding to a predetermined concentration or below; namely, a predetermined voltage or above, was obtained, a signal for actuating a fuel feed valve 19 was sent, whereby the methanol concentration of the anolyte could be controlled in 0.8-1.2 mol/l. It will be appreciated that the open-circuit potential of the cell shown in FIG. 9 has a methanol concentration-dependence as shown in FIG. 5. When the open-circuit potential of the unit cell is sensed by the voltmeter 17, the compensation device 18 controls the concentration of methanol to be a predetermined value by the water feed value 19 on the basis of the relationship between the open-circuit potential and the methanol concentration illustrated in FIG. 5.

When a parallel-plate metal including noble metals is used as the counter-electrode, the whole surfaces of it are coated with platinum black. The coated counter-electrode or a porous counter-electrode used as the counter-electrode are mounted on the center portion of the branch pipe of the detection portion 222 which is made from polyacrylic acid resin or polyvinyl chloride, after the lead wire is connected to it. The device of this embodiment shall be denoted by I in the following example.

Figure 11:
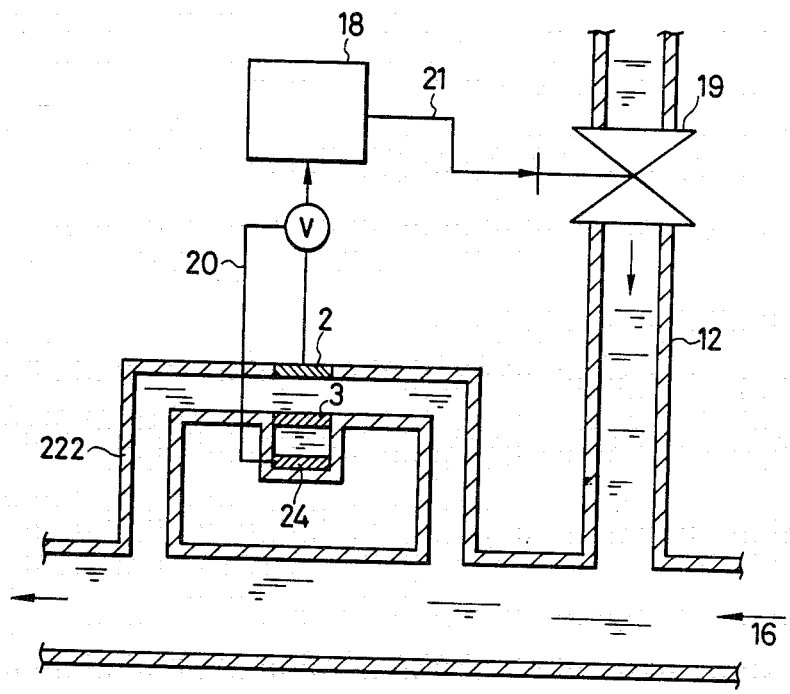
FIG. 11 is a schematic view of a still further embodiment (VI) of a methanol concentration control device.

Referring to FIG. 11, the methanol concentration detection portion is basically the same as that shown in FIG. 10, but it has the feature that a diaphragm 3 formed of an ion-exchange membrane is interposed between the air electrode 2 and the counter electrode 24. The interspace between the diaphragm 3 and the counter electrode 24 is filled up with a standard anolyte liquid to be adjusted. The air electrode 2 and counter electrode 24 are the small pieces of the air electrode and methanol electrode constituting the fuel cell stack 8, respectively. In the present example, the counter electrode 24 is always held in a solution of fixed composition and, therefore, exhibits a constant potential, so that the potential difference across both the electrodes; namely, the cell voltage, exhibits a methanol concentration dependence as in FIG. 10. Thus, owing to a similar system, the methanol concentration of the anolyte could be controlled in a range of 0.7-1.2 mol/l. In this embodiment, a standard fuel (containing 4 wt.% methanol) is enclosed between the counter-electrode 24 and the diaphragm 3. The diaphragm 3 shown in FIG. 11 works the same as that of FIG. 2 When the hydrogen ion at the solution of the above-mentioned standard fuel migrates through the ion exchange membrane or the diaphragm 3, and reaches to the oxidant electrode 2, the voltmeter detects the differential voltage between the counter-electrode 24 and the oxidant electrode 2. The device of this embodiment shall be denoted by J in the following examples.

The method of making the oxidant electrode and the fuel electrode used for the methanol concentration control device of the present invention is described in greater detail with reference to the following examples.

CATALYST PREPARATION REFERENCE EXAMPLE 1

After 50 ml of a 37% formaldehyde solution and 100 ml of a 50% potassium hydroxide solution were added to 20 gr of carbon powder (furnace black: CSX-150A2 produced by Cabot Inc.), distilled water was added in an amount of 500 ml, and the solution was stirred. While being stirred, the solution was cooled to $0 \pm 2°$ C. To the resultant solution, a solution obtained by dissolving 28 gr of platinic chloride and 14 gr of ruthenium chloride in distilled water into an amount of 500 ml while holding the temperature of $0 \pm 2°$ C. After the addition, the solution was returned to the room temperature. It was subsequently stirred at 35°–40° C. for about 2 hours, and was further stirred at 55°–60° C. for about 2 hours. After the end of the stirring, a solid material was washed with distilled water, and the washing was repeated until the pH of slurry became 7 or less. Cake after the washing was sufficiently dried at 80° C. by a drier, to obtain a fuel electrode catalyst powder A.

CATALYST PREPARATION REFERENCE EXAMPLE 2

1 liter of (1:1) methanol—$H_2O$ was added to 15 gr of carbon powder (furnace black: CSX-150A2). Further, 31 gr of platinic chloride was dissolved, and the resultant solution was heated and stirred at 70° C for about 5 hours. After the end of the stirring, a solid material was repeatedly washed with distilled water until the pH became 7 or less. Cake after the washing was dried (80° C), to obtain an oxidant electrode catalyst powder B.

EXAMPLE 1

1.15 gr of the catalyst powder A was taken, 2 ml of distilled water was added thereto, and the mixture was kneaded well. Subsequently, 1 ml of tetrafluoroethylene liquid (obtained by diluting to 2.5 times Polyfurondispersion D1 produced by Daikin) was added and mixed well. A porous carbon base (Kureca Paper E-715 produced by Kureha Kagaku) of $100 \times 128$ mm was uniformly coated with the resultant pasty catalyst. After air-drying the catalyst, the base was baked in a nitrogen atmosphere at 300° C for about 30 minutes. The baked base was used as a fuel electrode.

EXAMPLE 2

0.77 gr of the catalyst powder B was taken, distilled water was added thereto, and the mixture was kneaded. Thereafter, 0.55 ml of Polyfurondispersion was added, and the resultant mixture was applied on the porous carbon base of $100 \times 128$ mm. After air-drying the mixture, the base was baked in the air at 300° C for about 30 minutes. Thus, an oxidant electrode was obtained.

Figure 12:
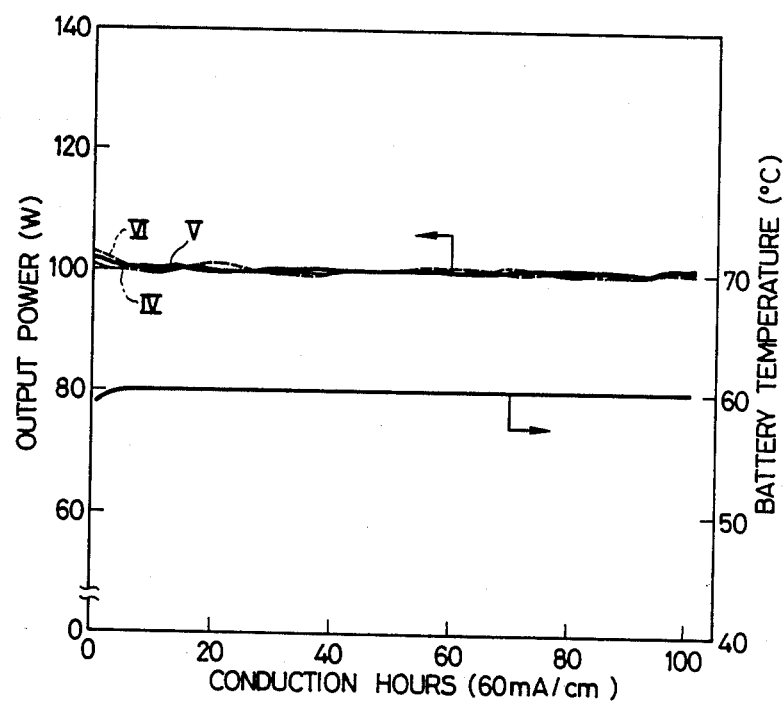
FIG. 12 is a characteristic diagram showing the relationships between the conduction time at a current density of 60 mA/cm$^2$ and the cell voltage as well as the cell temperature, in fuel cells, respectively, equipped with the methanol concentration control devices of embodiments (I), (IV) and (V).

Devices having these electrodes and having the constructions of embodiments E, F, G, H, I and J, were subjected to continuous operation tests of 100 hours at a cell current density of 60 mA/cm$^2$. The fuel tank 11 of each sample was filled up with anolyte consisting of 1 mol/l of methanol and 1.5 mol/l of sulfuric acid, and the fuel tank 12 with methanol: water at a ratio of 2:1. The results of E, H and I are indicated by curves IV (device E), V (device H) and VI (device I) in FIG. 12, respectively. Any of the devices E, H and I could maintain its output power constant. In addition, the cell temperature was constant. Regarding the devices F, G and J, not illustrated, results similar to those of devices E, H and I were obtained in both the output power and the cell temperature.

The present invention may feed only the air, and since it is also capable of exposure to the atmospheric air, it requires no air chamber. The prior art requires a temperature compensation device for detecting and compensating a temperature; whereas the present invention does not require any temperature compensation device at operating temperatures of 40°–60° C. Because, the methanol concentration control device of the present invention can control the methanol concentration using the open-circuit voltage of the electrodes, it can control the the methanol concentration in the state of no load, or in the state of no chemical reaction in the fuel cell. Therefore, the control device of the present invention does not need any temperature compensation device for compensating the temperature rise or degression of the fuel cell caused by the chemical reaction of the fuel cell. In the prior art, methanol inevitably mixes into air air chamber through the membrane, so the electrolyte liquid which is fresh (which contains no methanol) needs to be continuously fed into the air chamber. On the other hand, the present invention detects the methanol concentration on the basis of the amount by which the methanol permeates and mixes into the air electrode heretofore described. In the prior art devices, the electrode is made of a wire type electrode, and it is difficult to enlarge the effective surface area of an active substance (for example, platinum wire). In contrast, the present invention can use a catalyst of large effective surface area in which the same active substance as used in a fuel cell stack is carried at high dispersion.

We claim:

1. A fuel cell having a fuel cell fuel electrode and a fuel cell oxidant electrode which are arranged on both sides of an electrolyte, and a device for controlling a concentration of fuel to be fed to the fuel cell from a fuel supply means, said device for controlling a concentration of fuel to be fed to the fuel cell from a fuel supply means comprising:

a fuel cell concentration detection portion including a detection oxidant electrode which directly contacts with air at one main surface thereof, and a detection counter electrode which is disposed in opposition to said detection oxidant electrode, an ion-exchange membrane interposed between said detection oxidant electrode and said detection counter electrode, an interspace between another main surface of said detection oxidant electrode and said ion-exchange membrane being supplied with the fuel which is to be fed to said fuel cell and which contains an electrolyte, thereby to detect the fuel concentration by an electrode potential lowering phenomenon caused by a direct reaction of the fuel with an oxidant on said another main surface of said detection oxidant electrode, means for detecting a potential between the detection electrodes, and means for controlling said fuel from said fuel supply means to said fuel cell in such a way that said potential is held at a constant value.

2. A fuel cell as defned n claim 11, wherein said fuel comprises a liquid fuel.

3. A fuel cell as defined in claim 2, wherein said liquid fuel comprises methanol.

4. A fuel cell as defined in claim 1, wherein said detection oxidant electrode includes an electrically-conductive porous substrate containing at least one element of the Group VI and Group VIII of the Periodic Table, or an electrically-conductive powder containing at least one element of the Group VI and Group VIII of the Periodic Table, and a binder.

5. A fuel cell as defined in claim 4, wherein said binder comprises a water-repelling binder.

6. A fuel cell as defined in claim 1, wherein said fuel cell concentration detection portion is disposed in pipe means branching off the fuel supply means.

7. In a fuel cell having a fuel cell fuel electrode and a fuel cell oxidant electrode which are arranged in opposition, an electrolyte which is located between the electrodes, and a device for controlling a concentration of fuel to be fed to the fuel cell from a fuel supply means, said device comprising:

a fuel concentration detection portion including a detection fuel electrode one main surface of which directly contacts with a portion of the fuel before the fuel is fed to said fuel cell, a detection oxidant electrode one main surface of which directly contacts with air, and an electrolyte which comprises an ion-exchange membrane and which contacts directly with another main surface of said detection fuel electrode and with another main surface of said detection oxidant electrode, respectively, at both main surfaces thereof, a further fuel concentration detection portion which includes a further detection fuel electrode one main surface of which directly contacts with a standard solution, a further detection oxidant electrode one main surface of which directly contacts with air, and an ion-exchange membrane between said further detection fuel electrode and said further detection oxidant electrode and facing another main surface of each of said further detection fuel electrode and said further detection oxidant electrode, means for detecting a potential difference between the detection fuel electrode and the detection oxidant electrode, and means for controlling said fuel from said fuel supply means to said fuel cell in such a way that said potential difference is held at a constant value.

8. A fuel cell as defined in claim 7, comprising further means for detecting a potential difference between the further detection fuel electrode and further detection oxidant electrode, with the means for controlling said fuel being responsive to the means for detecting a potential difference between said detection electrodes and said further means for detecting a potential difference between the further detection fuel electrode and further detection oxidant electrode.

9. A fuel cell as defined in claim 8, further comprising a compensator means, with an output of said means for detecting a potential difference between said detection electrodes and an output of said further means for detecting a potential difference between the further detection fuel electrode and further detection oxidant electrode being transmitted to said compensator means.

10. A fuel cell as defined in claim 9, wherein an output of said compensator means is transmitted to said means for controlling said detection fuel.

11. A fuel cell as defined in claim 7, wherein said solution contacting said further detection fuel electrode is a reference anolyte solution or a solution of the electrolyte.

12. A fuel cell as defined in claim 7, wherein the one main surface of the detection oxidant electrode and the one main surface of the further detection oxidant electrode are each in contact with atmospheric air.

13. In a fuel cell having a fuel cell fuel electrode and a fuel cell oxidant electrode which are arranged on both sides of an electrolyte, and a device for controlling a concentration of fuel to be fed to the fuel cell from a fuel supply means, said device comprising:

a fuel cell concentration detection portion including a detection oxidant electrode which directly contacts with air at one main surface thereof, and a detection counter electrode which is disposed in opposition to said detection oxidant electrode, an ion-exchange membrane interposed between said detection oxidant electrode and said detection counter electrode, an interspace between another main surface of said detection oxidant electrode and said ion-exchange membrane being supplied with the fuel which is to be fed to said fuel cell and which contains an electrolyte, a standard electrolytic solution being located between said ion-exchange membrane and said detection counter electrode, thereby to detect the fuel concentration by an electrode potential lowering phenomenon caused by a direct reaction of the fuel with an oxidant on said another main surface of said detection oxidant electrode, means for detecting a potential between the detection electrodes, and means for controlling said fuel from said fuel supply means to said fuel cell in such a way that said potential is held at a constant value.

* * * * *